Patented Sept. 1, 1931

1,820,957

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

METHOD OF PRESERVING ENZYME SOLUTIONS

No Drawing.     Application filed October 6, 1928. Serial No. 310,911.

This invention relates to certain improvements in a method or process of preserving enzyme solutions.

Enzyme solutions are now largely used for industrial purposes, such as in the textile industry, tanning industry, etc., and such enzyme solutions are prepared in various ways, either from animal products, as pancreas, or vegetable material, such as malt solutions, or they may be prepared from bacterial cultures or fungi moulds.

Such solutions are apt to spoil or deteriorate and certain preservatives or antiseptic substances have been used for preventing such deterioration, as for instance phenol or a phenol derivative or derivatives. For some purposes such phenol or its derivatives are unsuitable, or have to be used to obtain the desired preservative action in such quantities as to interfere with the stability of the enzyme solutions.

I have discovered that pine oil is especially well adapted for the preservation of such enzyme solutions and will give the desired preservative effect without interfering with the action of the enzyme or the stability of the enzyme solutions. This pine oil is used in quantities depending upon the enzyme solution to be preserved and the conditions prevailing in any particular case. I have found that one-half of one percent of pine oil by weight of the solution with which it is used is a proportion which gives satisfactory results.

The pine oil may be added to the enzyme solution either during the process of producing the solution or to the solution after it has been prepared, and furthermore the pine oil can be used alone or in conjunction with other preservatives which have no deleterious effect upon the stability of the solution or its enzymatic action, such for instance, as formaldehyde. While the proportion of pine oil stated is a satisfactory one, it will be understood that this can be varied as desired to suit any particular solution.

What I claim:

The method of preserving enzyme solutions which consists in the addition to the solution of pine oil in the proportion of one-half of one percent by weight of the solution to be preserved.

In testimony whereof, I have hereunto set my hand.

LEO WALLERSTEIN.